United States Patent Office 3,562,185
Patented Feb. 9, 1971

3,562,185
OXIDATION CATALYSTS CONTAINING VANADIUM PENTOXIDE AND TITANIUM DIOXIDE
Wilhelm Friedrichsen and Guenter Poehler, Ludwigshafen (Rhine), and Otto Goehre, Wilhelmsfeld, Germany, assignors to Badische Anilin- & Soda-Fabrik Aktiengesellschaft, Ludwigshafen (Rhine), Germany
No Drawing. Filed Dec. 27, 1967, Ser. No. 693,712
Claims priority, application Germany, Jan. 4, 1967,
P 16 42 921.3
Int. Cl. B01j 11/06, 11/32
U.S. Cl. 252—456      6 Claims

ABSTRACT OF THE DISCLOSURE

Catalysts containing vanadium pentoxide and titanium dioxide for the oxidation of aromatic and unsaturated hydrocarbons to carboxylic acids, consisting of an inert non-porous carrier which is coated with a porous composition containing 1 to 15% by weight of vanadium pentoxide and 85 to 99% by weight of titanium dioxide in a layer having a thickness of 0.02 to 2 mm., particularly 0.05 to 1 mm., the catalysts having a content of vanadium pentoxide of 0.05 to 3% by weight and the composition containing vanadium pentoxide and titanium dioxide having been applied in dissolved or suspended form to a carrier which has been heated to a temperature of 160° to 500° C., particularly 270° to 500° C.

---

The present invention relates to oxidation catalysts which are an improvement on the oxidation catalysts containing vanadium pentoxide and titanium dioxide according to copending U.S. application No. 548,404, now U.S. Pat. No. 3,464,930.

The said application relates to catalysts containing vanadium pentoxide and titanium dioxide for the oxidation of aromatic and unsaturated aliphatic hydrocarbons to carboxylic acids which comprise an inert non-porous carrier which is coated with a layer having a thickness of 0.02 to 2 mm., particularly 0.05 to 1 mm., of a porous composition which contains 1 to 15% by weight of vanadium pentoxide and 85 to 99% by weight of titanium dioxide, the catalysts having a content of vanadium pentoxide of from 0.05 to 3% by weight. Suitable non-porous inert carriers in accordance with said copending application include such materials as quartz or silicic acid or particularly porcelain, fused aluminum oxide, silicon carbide and fused or sintered silicates, for example aluminum silicate, magnesium silicate, zinc silicate and zirconium silicate and particularly steatite.

Those catalysts are preferred whose carrier material has been primed with an oxide of the metals vanadium, molybdenum, tungsten, chromium, titanium and/or iron prior to the application of the coating composition containing vanadium pentoxide and titanium dioxide.

Since the resistance to abrasion of the catalysts according to the said application leaves something to be desired, the object of the present invention is to overcome this disadvantage.

We have now found that the coating on catalysts which have been coated with the composition containing vanadium pentoxide and titanium dioxide by applying the composition in a dissolved or suspended form to a carrier which has been heated to a temperature of 160° to 500° C., particularly from 270° to 500° C., has greater strength.

It has also been found that in this case, too, it is advantageous to prime the carrier material (prior to coating) with an oxide of the metals vanadium, molybdenum, tungsten, chromium, titanium and/or iron.

The coating on the new catalysts has high strength. Whereas part of the coating has hitherto broken off frequently during transport and during feeding the catalyst into the oxidation reactor and therefore particularly careful handling has been necessary, the new catalysts exhibit only minimal abrasion. The coating no longer breaks off. There is no difference between the new catalysts and the catalysts of the said patent application as regards use of the catalyst, suitable catalyst carriers, any priming or pretreatment of the carrier, the composition used for coating the carrier and the carrying out of the oxidation reactions using the catalysts.

Coating may be carried out by heating the carrier (which may have been primed) to a temperature of from 160° to 500° C., preferably from 270° to 500° C. and particularly from 280° to 450° C. It is advantageous to use a heatable coating drum, a rotary furnace or a vibrating support.

The composition to be used as the catalyst coating and which in the dry state should contain 1 to 15% by weight of vanadium pentoxide and 85 to 99% by weight of titanium dioxide, is applied in dissolved or suspended condition to the carrier. Water or an organic solvent, such as formamide or alcohol, may be used as the solvent or suspension agent. Titanium dioxide is usually used in suspended form and vanadium pentoxide (or a vanadium compound convertible by heating into vanadium pentoxide) usually in dissolved form. In general a slurry of honey-like consistency is used. In the new method of coating, the water or other solvent or suspension agent vaporizes practically momentarily as soon as the composition comes into contact with the carrier.

The finished catalyst should contain 0.05 to 3%, preferably 0.1 to 2%, particularly 0.05 to 1%, by weight of vanadium pentoxide.

In addition to vanadium and titanium, the catalyst composition may contain small amounts, for example 0.1 to 5% by weight, of compounds of other elements such as copper, silver, lithium, niobium, arsenic, antimony, phosphorus, chromium, molybdenum, tungsten, manganese, iron, nickel, cobalt and aluminum.

The invention is illustrated by the following example.

EXAMPLE 790 g. of vanadyl oxalate is dissolved in 1670 g. of formamide and 10,650 g. of water and mixed with 5900 g. of finely divided anatase. 75 kg. of steatite balls having a diameter of 6 mm. is heated in a coating drum to 350° C. The hot balls are sprayed with the abovementioned mixture by means of spraying equipment. The drum is heated externally so that there is no drop in temperature during spraying. The whole of the liquid is evaporated at the moment of contact with the hot balls. The balls have a coating of 6.14% of active composition. The finished catalyst contains 0.48% of vanadium pentoxide.

If 100 g. of this catalyst be allowed to fall through a vertical tube having a length of 3 meters and a diameter of 0.25 meter, the catalyst loses only 0.25% of the active composition.

If on the contrary the balls are coated with the active composition at room temperature in the coating drum and then dried ta 200° C., the loss of active composition broken off in the same fall test is 12%.

Obviously it is possible to replace the titanium dioxide by a solution of a titanium compound which is converted into titanium dioxide when heated, for example an alcoholic solution of a titanium alcoholate or of titanium tetrachloride.

The different strengths of the coatings of catalysts coated at different temperatures may be seen from the following table.

TABLE

| Temperature of balls during spraying (° C.) | 170 | 220 | 250 | 270 | 315 | 350 |
|---|---|---|---|---|---|---|
| Loss of active composition in the fall test, percent | 8.4 | 5.8 | 5.2 | 1.5 | 0.34 | 0.25 |

41 g. of 98% o-xylene is passed per hour with 1100 liters of air at 410° C. over 400 g. of catalyst which has been coated at 350° C. The weight yield of phthalic anhydride in the first six hours is 102%; the activity of the catalyst is constant after seven days. The weight yield then is 114.8%.

We claim:

1. In a process for the production of a catalyst containing vanadium pentoxide and titanium dioxide, said catalyst consisting essentially of an inert non-porous carrier coated with a layer having a thickness of 0.02 to 2 mm. of a porous composition containing 1 to 15% by weight of vanadium pentoxide and 85 to 99% by weight of titanium dioxide, the catalyst including said carrier having a content of vanadium pentoxide of 0.05 to 3% by weight, the improvement which comprises:

heating the carrier to a temperature of 160° C. to 500° C.; and applying to the thus heated carrier to obtain a coated layer thereon a finely divided titanium dioxide in solid suspended form in a solvent containing the vanadium-pentoxide in suspended or dissolved form, the solvent being vaporized upon contact with the heater carrier.

2. A process as claimed in claim 1 wherein said carrier is heated to a temperature of from 270° C. to 500° C. prior to formation of the coated layer.

3. A process as claimed in claim 1 wherein the carrier, prior to said heating, is primed with an oxide of at least one metal selected from the class consisting of vanadium, molybdenum, tungsten, chromium and iron.

4. A process as claimed in claim 1 wherein said carrier is steatite.

5. The catalyst product having a strongly adherent and abrasion resistant coating obtained by the process of claim 1.

6. The catalyst product having a strongly adherent and abrasion resistant coating obtained by the process of claim 3.

References Cited

UNITED STATES PATENTS 3,464,930  9/1969  Friedrichsen _____ 252—469
2,763,569  9/1956  Bradstreet _____ 117—47

DANIEL E. WYMAN, Primary Examiner

P. M. FRENCH, Assistant Examiner

U.S. Cl. X.R.

252—457, 458, 459, 467, 468, 469, 470, 472, 473, 475, 477